US010638318B2

(12) United States Patent
Huang et al.

(10) Patent No.: US 10,638,318 B2
(45) Date of Patent: Apr. 28, 2020

(54) OPTICAL CHAOS BASED WIRELESS DEVICE FINGERPRINTING

(71) Applicant: NEC Laboratories America, Inc., Princeton, NJ (US)

(72) Inventors: Yue-Kai Huang, Princeton, NJ (US); Yechi Ma, Princeton, NJ (US)

(73) Assignee: NEC Corporation (JP)

( * ) Notice: Subject to any disclaimer, the term of this patent is extended or adjusted under 35 U.S.C. 154(b) by 194 days.

(21) Appl. No.: 15/694,209

(22) Filed: Sep. 1, 2017

(65) Prior Publication Data

US 2018/0103374 A1  Apr. 12, 2018

Related U.S. Application Data

(60) Provisional application No. 62/406,030, filed on Oct. 10, 2016.

(51) Int. Cl.
| | |
|---|---|
| H04L 29/06 | (2006.01) |
| H04W 12/06 | (2009.01) |
| H04L 9/32 | (2006.01) |
| G09C 1/00 | (2006.01) |
| H04W 88/08 | (2009.01) |
| H04W 12/00 | (2009.01) |

(52) U.S. Cl.
CPC ............. *H04W 12/06* (2013.01); *G09C 1/00* (2013.01); *H04L 9/3278* (2013.01); *H04L 63/0876* (2013.01); *H04L 2209/805* (2013.01); *H04W 12/00504* (2019.01); *H04W 88/08* (2013.01)

(58) Field of Classification Search
CPC .......... H04W 12/06; H04W 12/00504; H04W 88/08; G09C 1/00; H04L 63/0876; H04L 9/3278; H04L 2209/805
See application file for complete search history.

(56) References Cited

U.S. PATENT DOCUMENTS

| | | | | |
|---|---|---|---|---|
| 8,238,889 B1 * | 8/2012 | Vu | .................. | H04W 48/18 |
| | | | | 455/414.3 |
| 2003/0169713 A1 * | 9/2003 | Luo | .................. | H04L 63/04 |
| | | | | 370/338 |
| 2004/0053601 A1 * | 3/2004 | Frank | ................. | G01S 5/0252 |
| | | | | 455/411 |
| 2018/0309570 A1 * | 10/2018 | Amini | .................. | H04L 1/18 |

OTHER PUBLICATIONS

Vanwiggeren et al., "Communication with Chaotic Lasers," Science, vol. 279. Feb. 20, 1998. pp. 1198-1200.

(Continued)

*Primary Examiner* — John B King
(74) *Attorney, Agent, or Firm* — Joseph Kolodka

(57) ABSTRACT

A computer-implemented method for authenticating an access point attempting to access a wireless network is presented. The computer-implemented method includes receiving an authentication challenge from the access point, analyzing the authentication challenge at a wireless node by using an optical chaos generation module having an optical section and a radio frequency (RF) section to facilitate reproducibility, unpredictability, and unclonability of challenge-response pairs, and transmitting an authentication response to the access point.

20 Claims, 6 Drawing Sheets

(56) References Cited

OTHER PUBLICATIONS

Pappu et al., "Physical One-Way Functions," Science, vol. 297. Sep. 20, 2002. pp. 2026-2030.
Argyris et al., "Chaos-based communications at hight bit rates using commercial fibre-optic links," Nature Publishing Group. vol. 438. Nov. 17, 2005. pp. 343-346.
Brik et al., "Wireless Device Identification and Radiometric Signatures," 14th ACM International Conference on Mobile Computing and Networking 2008. Sep. 14-19, 2008. pp. 116-127.
Franklin et al., "Passive Data Link Layer 802.11 Wireless Device Driver Fingerprinting," 15th USENIX Security Symposium. Jul. 31-Aug. 4, 2006. pp. 167-178.
Lin et al., "Nonlinear Dynamics of a Semiconductor Laser With Delayed Negative Optoelectronic Feedback," IEEE Journal of Quantum Electronics. vol. 39. No. 4. Apr. 2003. pp. 562-568.
Suh et al., "Physical Unclonable Functions for Device Authentication and Secret Key Generation," 44th Design Automation Conference 2007. Jun. 4-8, 2007. pp. 1-6.
Tang et al., "Chaotic Pulsing and Quasi-Periodic Route to Chaos in a Semiconductor Laser with Delayed Opto-Electronic Feedback," IEEE Journal of Quantum Electronics. vol. 37. No. 3. Mar. 2001. pp. 329-336.

\* cited by examiner

OPTICAL CHAOS BASED WIRELESS DEVICE FINGERPRINTING

RELATED APPLICATION INFORMATION

This application claims priority to Provisional Application No. 62/406,030, filed on Oct. 10, 2016, incorporated herein by reference in its entirety.

BACKGROUND

Technical Field

The present invention relates to wireless networks and, more particularly, to authenticating an access point attempting to access the wireless network.

Description of the Related Art

With the proliferation of mobile devices and the advent of the Internet of Things (IoT), wireless technologies are becoming essential parts in modern computing platforms and embedded systems to provide low-cost, anytime, and anywhere connectivity. While wireless networks share many of the same vulnerabilities as wired networks, the broadcast nature of a wireless transmission medium tends to aggravate the situation by making it easier to compromise service accessibility at a larger scale. Many wireless networks such as wireless mesh networks, wireless sensor networks, cognitive radio networks, and small cell networks are particularly vulnerable to node forgery and insider attacks once malicious users obtain security credentials from legitimate users and become part of the networks. Combined with other attack tactics, node forgery can be used to launch more sophisticated attacks that may greatly compromise the networks' serviceability and confidentiality. Therefore, novel and low-complexity methods for efficiently identifying legitimate users and detecting potential identity spoofing attacks from malicious adversaries are of great importance.

SUMMARY

A computer-implemented method for authenticating an access point attempting to access a wireless network is presented. The method includes receiving an authentication challenge from the access point, analyzing the authentication challenge at a wireless node by using an optical chaos generation module having an optical section and a radio frequency (RF) section to facilitate reproducibility, unpredictability, and unclonability of challenge-response pairs, and transmitting an authentication response to the access point.

A system for authenticating an access point attempting to access a wireless network is presented. The system includes a memory and a processor in communication with the memory, wherein the processor is configured to receive an authentication challenge from the access point, analyze the authentication challenge at a wireless node by using an optical chaos generation module having an optical section and a radio frequency (RF) section to facilitate reproducibility, unpredictability, and unclonability of challenge-response pairs, and transmit an authentication response to the access point.

A non-transitory computer-readable storage medium including a computer-readable program for authenticating an access point attempting to access a wireless network is presented, wherein the computer-readable program when executed on a computer causes the computer to perform the steps of receiving an authentication challenge from the access point, analyzing the authentication challenge at a wireless node by using an optical chaos generation module having an optical section and a radio frequency (RF) section to facilitate reproducibility, unpredictability, and unclonability of challenge-response pairs, and transmitting an authentication response to the access point.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
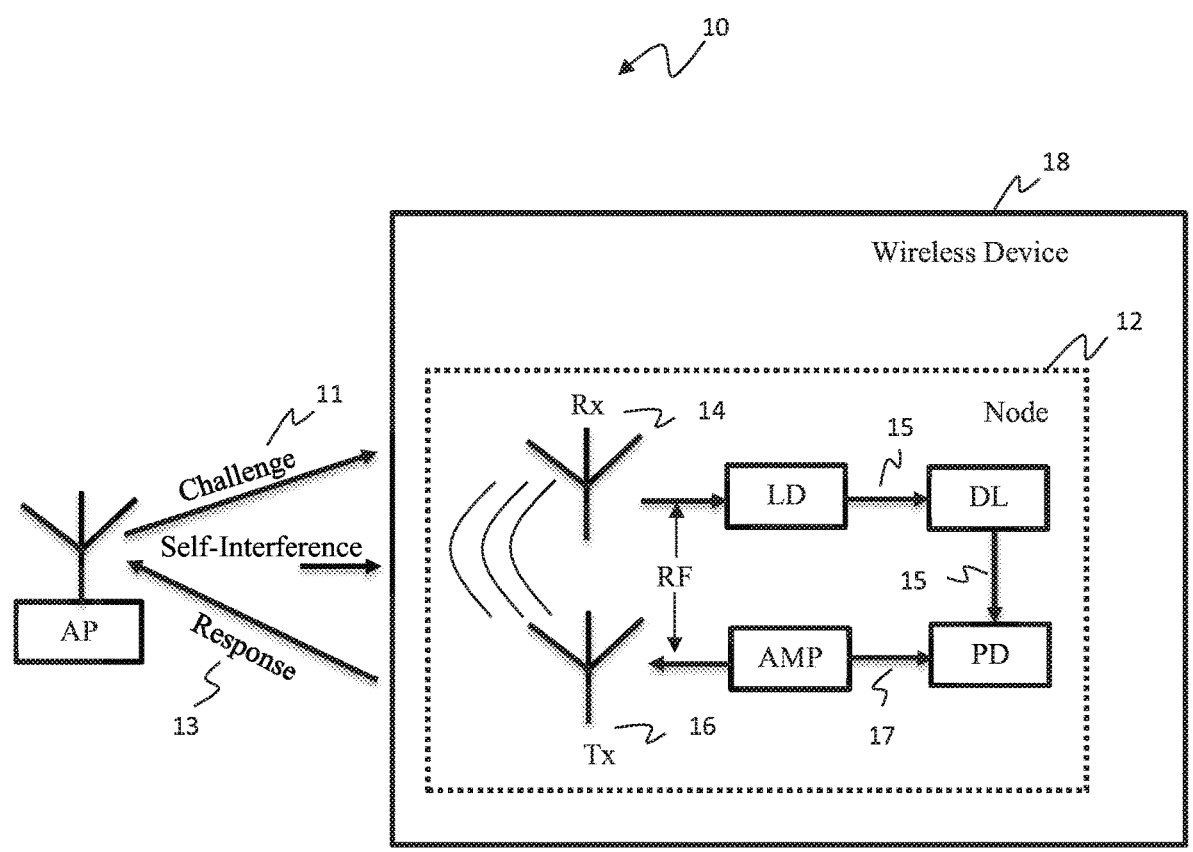
FIG. 1 is a block/flow diagram illustrating an optical chaos based wireless device fingerprinting system, in accordance with embodiments of the present invention.

The Internet of Things (IoT) enables advanced connectivity of computing and embedded devices through internet infrastructure. IoT involves machine-to-machine communications (M2M), where it is important to continuously monitor connected machines to detect any malicious users. Malicious users can be detected by, e.g., device fingerprinting techniques.

Device fingerprinting is a process for gathering device information to generate device-specific signatures and using such information to identify individual devices. Device fingerprinting can reduce vulnerability of wireless networks to node forgery or insider attacks. The basic idea is to extract unique patterns (also called features) manifested during the process of wireless communication from target devices. A variety of features can be extracted and utilized including physical layer (PHY) features, medium access control (MAC) layer features, and upper layer features. At the physical layer, despite significant advancement in microelectronic circuit design and manufacturing, there are still imperfections in the manufacturing process of wireless devices. Such imperfections result in broad variations in key device parameters among production lots, which allow for unique characterization of the devices and form device fingerprints. Effective device fingerprints satisfy two properties that include: i) they are difficult or impossible to forge, and ii) the features should be stable in the presence of environment changes and node mobility. Devices with fingerprints satisfying these two requirements are often referred to as physically unclonable function (PUF).

In the exemplary embodiments of the present invention, a PUF is introduced which involves optical chaos that is often generated using nonlinear dynamics of semiconductor lasers, and that has been demonstrated for secure optical communication or random number generations.

Embodiments in accordance with the present invention further provide methods and devices for receiving communications from IoT sensors incorporated in IoT systems/devices/architectures/infrastructures to use an optical chaos generation module to detect potential node forgery. The optical chaos generation module can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The optical chaos generation module described herein can be incorporated into any type of electronic devices for any type of use or application or operation.

FIG. 1 is a block/flow diagram illustrating an optical chaos based wireless device fingerprinting system, in accordance with embodiments of the present invention.

An authentication mechanism is presented that leverages optical chaos as a unique physically unclonable function (PUF). Optical chaos is generated through a wireless-photonic system with a directly modulated semiconductor laser in conjunction with a delayed opto-electronic feedback. The optical chaos generation module/system accepts or receives authentication challenges and replies with authentication responses whose behavior is reproducible for a legitimate node while unpredictable for an unauthorized node. This optical chaos based authentication method provides a complementary way to the existing software based authentication methods and offers an enhanced level of authentication security.

The optical chaos generation module/system integrates optical chaos generation and wireless communications in a single design that could potentially lower the implementation cost. In particular, the exemplary embodiments of the present invention construct the delayed opto-electronic feedback through self-interference of a two-antenna wireless system, which increases system complexity by introducing additional parameters into the optical chaos generation mechanism. The location awareness property (e.g., the multi-path interference effect of a two-antenna system) of the present authentication system further enhances its security against node forgery.

Compared to software-based authentication methods, the exemplary embodiments of the present invention relieve the wireless network from authentication key distribution in terms of message authentication code (MAC) or certificate distribution in terms of public key cryptography. The exemplary embodiments of the present invention also simplify authentication protocol design by having a central server handle all decision making of an authentication process while letting the wireless device only passively process challenges and produce corresponding responses. Moreover, the invention provides better authentication performance in terms of faster authentication speed and lower computational capability requirement.

Referring to FIG. 1, the authentication is carried out by an access point (AP) upon the wireless node 12 that wants to join the wireless network 10. The wireless node 12 is located inside or within a wireless device 18. A wireless access point (WAP), or more generally just access point (AP), is a networking hardware device that allows a Wi-Fi device to connect to a wired network. The AP usually connects to a router (via a wired network) as a standalone device, but it can also be an integral component of the router itself. The wireless node 12 is a two-antenna system that incorporates an optical chaos generation module/system 401. The wireless node 12 accepts the authentication challenge 11 from the access point using the receiving antenna (Rx) 14, processes the challenge 11 within the optical chaos generation system, and outputs the optical chaos signal as the authentication response 13 back to the access point using the transmitting antenna (Tx) 16.

The overall optical chaos generation module/system 401 is a semiconductor laser in conjunction with a delayed opto-electronic feedback, which can be divided into two subsystems, that is, an optical section 403 and a radio frequency (RF) section 405. The optical section 403 includes a directly modulated laser. The optical output of the laser diode (LD) is delayed in a time domain by a tunable delay line (DL) and received by a photodiode (PD) afterwards. All optical connections are made up of, e.g., optical fibers or waveguides 15. The RF section 405 includes an RF amplifier (AMP) that amplifies the RF output of the photodiode to the transmitting antenna (Tx) 16. The feedback loop of the optical chaos generation system 401 is completed through the self-interference of the transmitting antenna upon the receiving antenna (on the same wireless node). In that case, the interference signal combines with the challenge signal at the receiving antenna, and directly modulate the laser diode together. The RF connections are made up of RF cables 17.

The wireless device 18 using the AP is authenticated using specific challenge-response pairs. Each challenge-response pair goes through two authentication procedures, that is, enrollment and authentication. In enrollment (e.g., before the first time a wireless device 18 is allowed into wireless network 10), the access point sends all possible challenges to the wireless device 18 and records a response received in association with the device ID. Then in authentication, the access point picks one challenge each time an authentication request is made by the wireless device 18 claiming a certain device ID, and checks if the response is the same as the response received before.

Each challenge-response pair can be used only once for authentication and the list of challenge-response pairs can be updated from time to time. The optical chaos response can be digitized. There is a clear trade-off between authentication security and complexity. The larger a number of binary digits digitized for the response, the more binary digits the unauthorized node has to match in the response, while signal processing needs to be performed at the access node (or central server).

Figure 2:
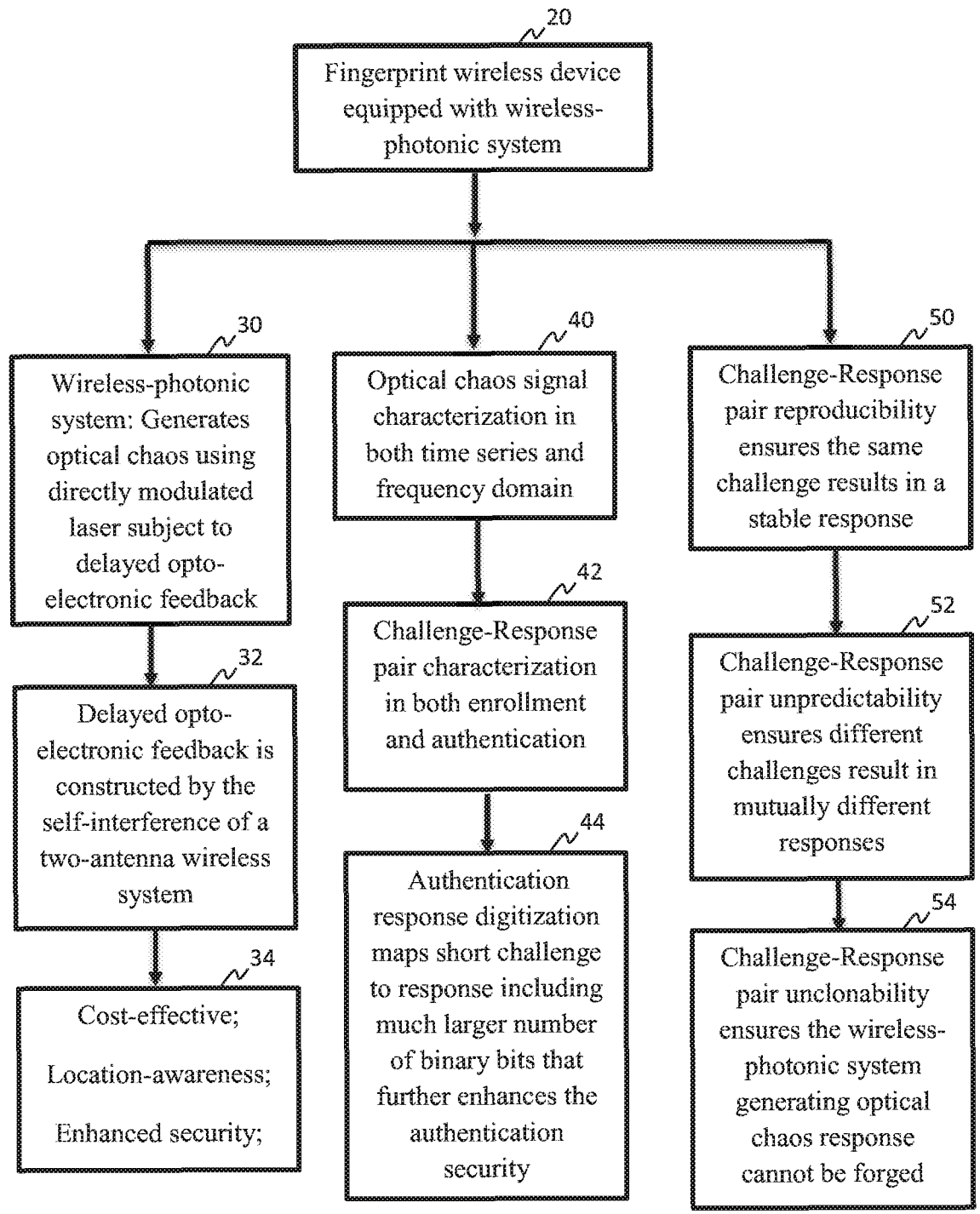
FIG. 2 is a block/flow diagram of a process flow for the optical chaos based wireless device fingerprinting system, in accordance with embodiments of the present invention.

FIG. 2 is a block/flow diagram of process flow of the optical chaos based wireless device fingerprinting system, in accordance with embodiments of the present invention.

At block 20, a fingerprint wireless device 18 is equipped with a wireless-photonic system. Block 20 continues to blocks 30, 40, 50.

At block 30, the wireless-photonic system generates optical chaos using a directly modulated laser subject to delayed opto-electronic feedback.

At block 32, delayed opto-electronic feedback is constructed by the self-interference of a two-antenna wireless system.

At block 34, the wireless-photonic system is determined to operate in a cost-effective manner, while providing optimal location-awareness and enhanced security.

At block 40, optical chaos signal characterization is performed in both time series and frequency domain.

At block 42, challenge-response pair characterization takes place in both enrollment and authentication.

At block 44, authentication response digitization maps short challenge to response including much larger number of binary bits that further enhances the authentication security.

At block 50, challenge-response pair reproducibility ensures the same challenge results in a stable response.

At block 52, challenge-response pair unpredictability ensures different challenges result in mutually different responses.

At block 54, challenge-response pair unclonability ensures that the wireless-photonic system generating an optical chaos response cannot be forged.

Figure 3:
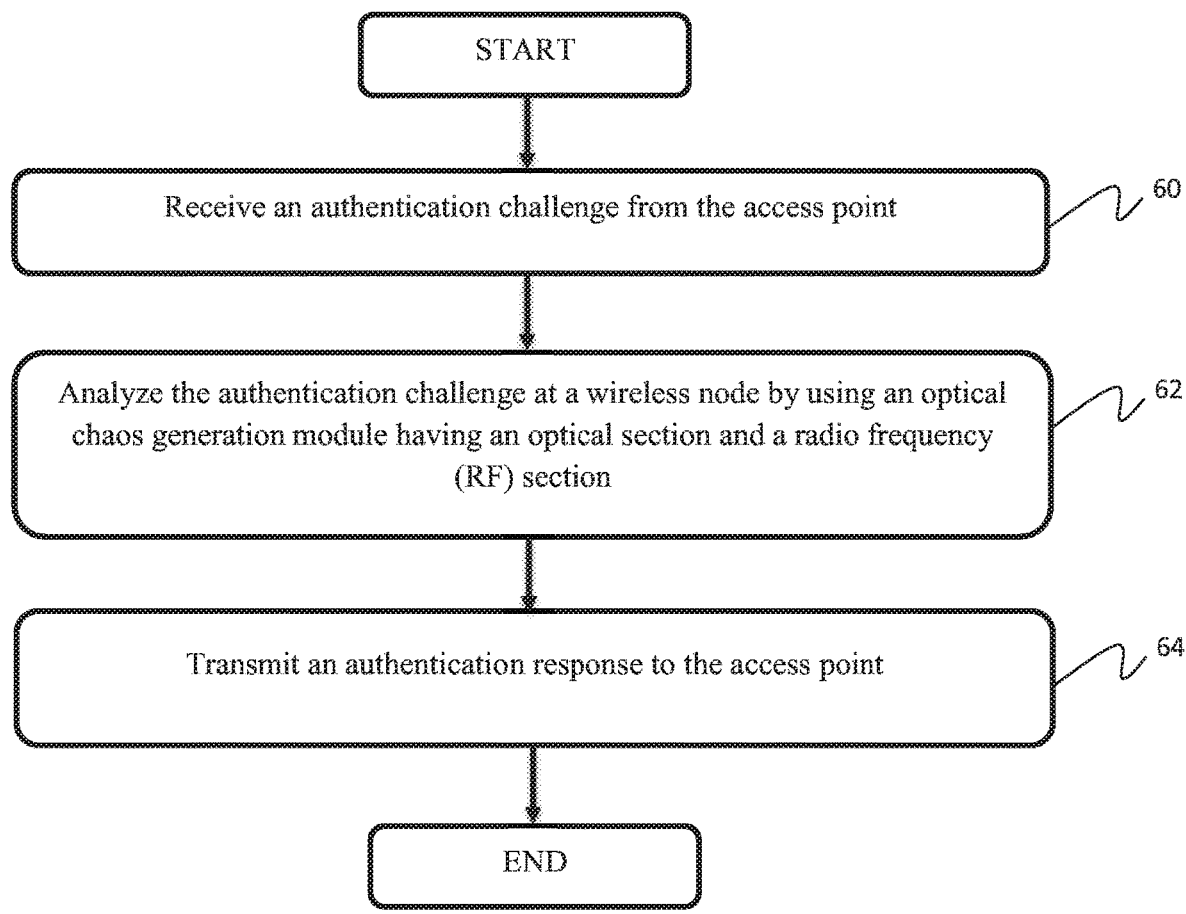
FIG. 3 is a block/flow diagram of a method for authenticating an access point attempting to access a wireless network, in accordance with embodiments of the present invention.

FIG. 3 is a block/flow diagram of a method for authenticating an access point attempting to access a wireless network, in accordance with embodiments of the present invention.

At block 60, an authentication challenge is received from the access point.

At block 62, the authentication challenge is analyzed at a wireless node by using an optical chaos generation module 401 having an optical section 403 and a radio frequency (RF) section 405.

At block 64, an authentication response is transmitted to the access point.

In summary, the optical chaos generation module/system is constructed by an optical section and a two-antenna wireless system collectively. This optical chaos generation module/system design unifies the optical chaos generation and the wireless communications on the same platform to reduce potential implementation cost, and introduces wireless configurations (e.g., interference strength) into the chaos complexity to further enhance its security. In the exemplary embodiments of the present invention, synchronization of optical transmitter and receiver, which is a major obstacle in chaos communications, is no longer required. Instead, the systems and methods herein utilize this inherent difficulty of duplicating the same optical chaos generation system, so that the challenge-response pair from an authenticated device cannot be cloned by another unauthorized wireless device.

Moreover, optical chaos is applied as an optical PUF that is capable of processing authentication messages in the form of binary digits. The digitization of the optical chaos records the authentication response pattern in the binary format whose length could be considerably larger than that of the authentication challenge. This not only facilitates the investigation of the reproducibility, unpredictability, and unclonability of the challenge-response pair, but also increases overall security of the authentication mechanism since unauthorized nodes need to match both the optical chaos response and its corresponding digitization method adopted. Therefore, authentication goals include response consistency given the same challenge/system settings and response variability given different challenge/system settings.

Figure 4:
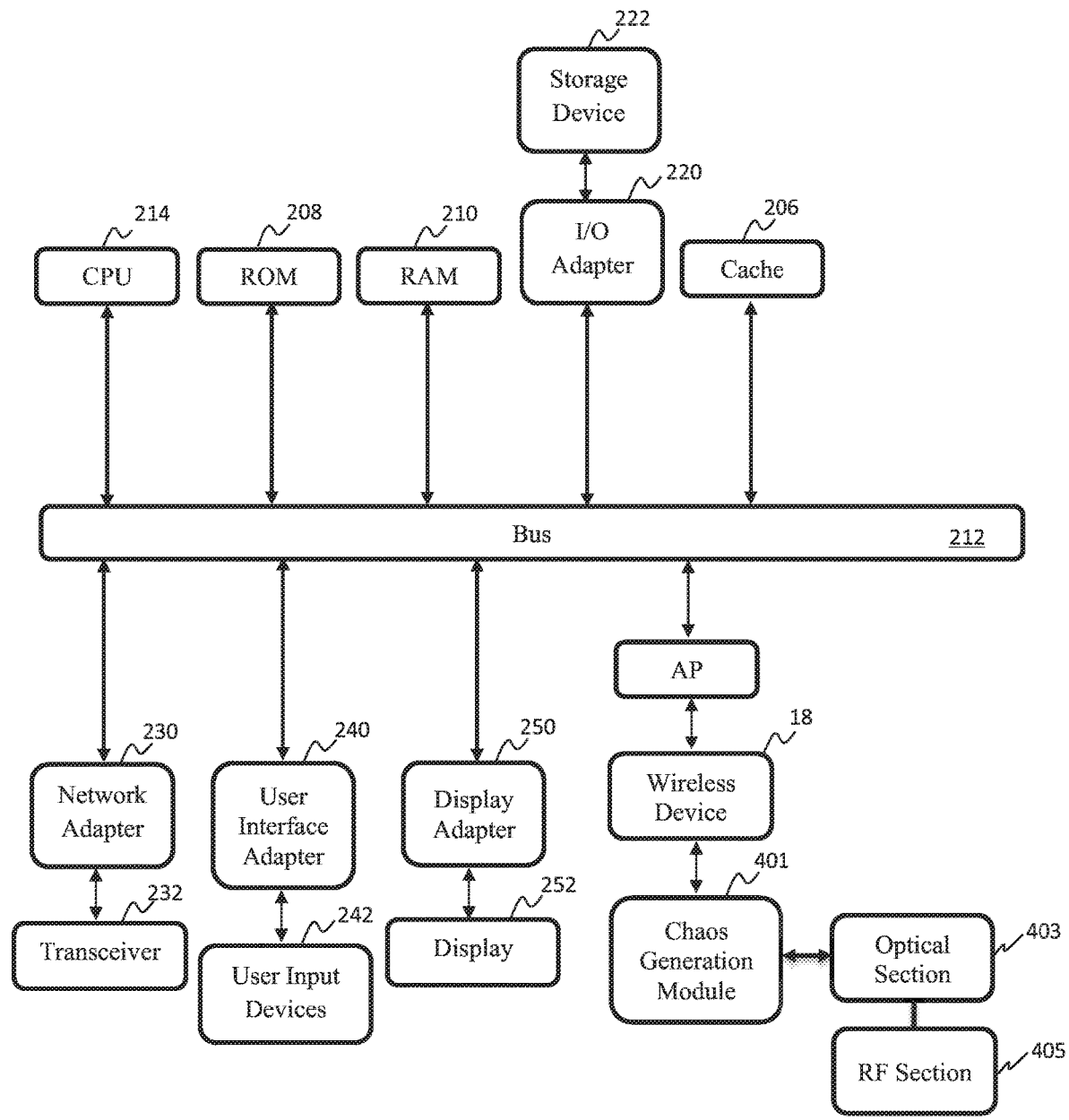
FIG. 4 is an exemplary processing system for authenticating an access point attempting to access a wireless network via a chaos generation module, in accordance with embodiments of the present invention.

FIG. 4 is an exemplary processing system for authenticating an access point attempting to access a wireless network, in accordance with embodiments of the present invention.

The processing system includes at least one processor (CPU) 214 operatively coupled to other components via a system bus 212. A cache 206, a Read Only Memory (ROM) 208, a Random Access Memory (RAM) 210, an input/output (I/O) adapter 220, a network adapter 230, a user interface adapter 240, and a display adapter 250, are operatively coupled to the system bus 212. Additionally, an access point (AP) connected to a wireless device 18 is operatively coupled to the system bus 212. Also, the chaos generation module 401 is operatively connected to the bus 212 via the wireless device 18, the chaos generation module 401 including the optical section 403 and the RF section 405.

A storage device 222 is operatively coupled to system bus 212 by the I/O adapter 220. The storage device 222 can be any of a disk storage device (e.g., a magnetic or optical disk storage device), a solid state magnetic device, and so forth.

A transceiver 232 is operatively coupled to system bus 212 by network adapter 230.

User input devices 242 are operatively coupled to system bus 212 by user interface adapter 240. The user input devices 242 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 242 can be the same type of user input device or different types of user input devices. The user input devices 242 are used to input and output information to and from the processing system.

A display device 252 is operatively coupled to system bus 212 by display adapter 250.

Of course, the chaos generation processing system may also include other elements (not shown), as readily contemplated by one of skill in the art, as well as omit certain elements. For example, various other input devices and/or output devices can be included in the chaos generation system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the chaos generation processing system are readily contemplated by one of ordinary skill in the art given the teachings of the present invention provided herein.

Figure 5:
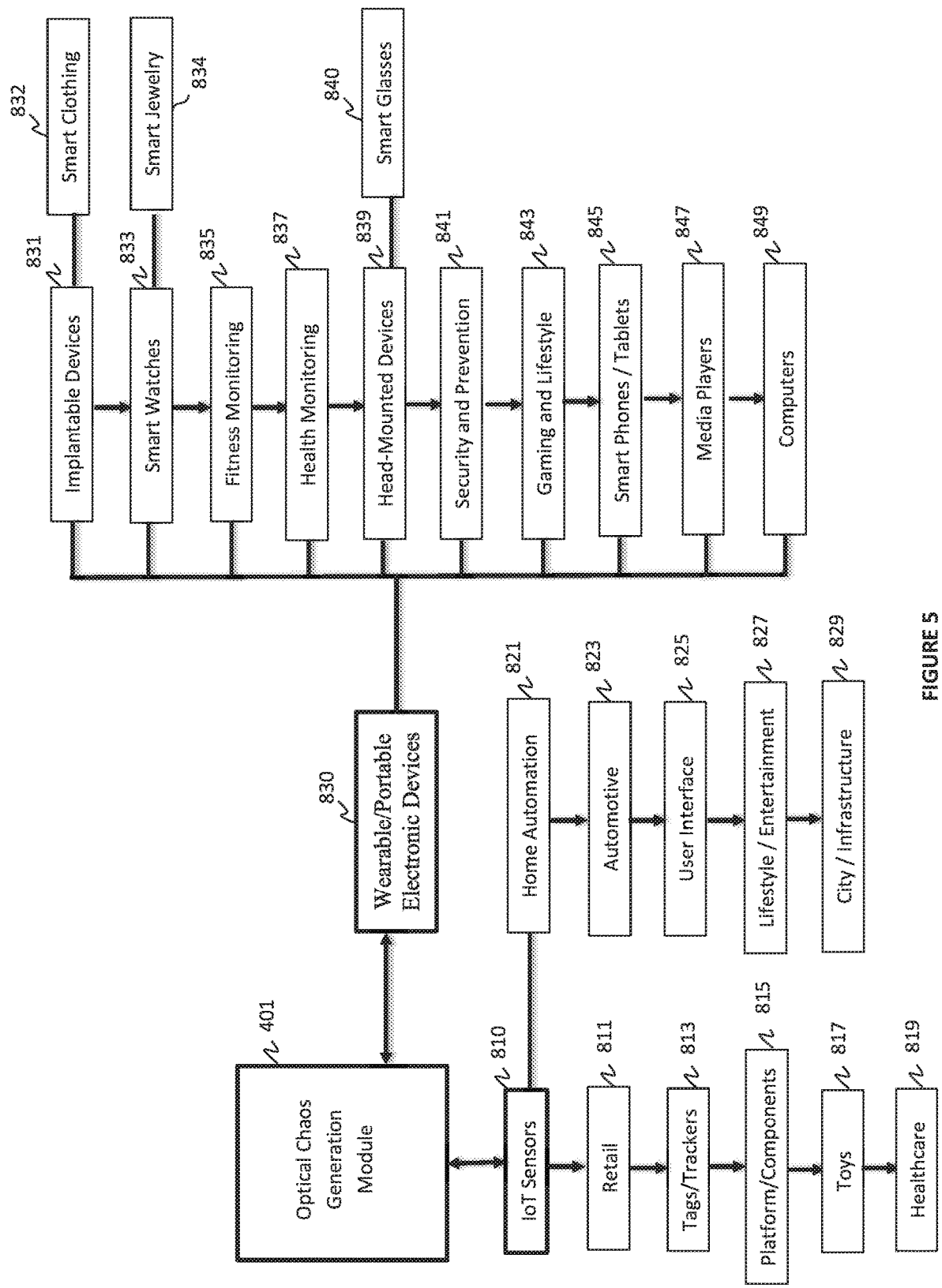
FIG. 5 is a block/flow diagram of a method for authenticating access points within Internet of Things (IoT) systems/devices/infrastructure, in accordance with embodiments of the present invention.

FIG. 5 is a block/flow diagram of a method for authenticating access points within Internet of Things (IoT) systems/devices/infrastructure, in accordance with embodiments of the present invention.

IoT (Internet of Things) is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. They enhance data collection, automation, operations, and much more through smart devices and powerful enabling technology.

IoT systems allow users to achieve deeper automation, analysis, and integration within a system. They improve the reach of these areas and their accuracy. IoT utilizes existing and emerging technology for sensing, networking, and robotics. Features of IoT include artificial intelligence, connectivity, sensors, active engagement, and small device use.

In various embodiments, the chaos generation module 401 of the present invention can be incorporated into a variety of different devices and/or systems. For example, the chaos generation module 401 can be incorporated into wearable or portable electronic devices 830. Wearable/portable electronic devices 830 can include implantable devices 831, such as smart clothing 832. Wearable/portable devices 830 can include smart watches 833, as well as smart jewelry 834. Wearable/portable devices 830 can further include fitness monitoring devices 835, health and wellness monitoring devices 837, head-mounted devices 839 (e.g., smart glasses 840), security and prevention systems 841, gaming and lifestyle devices 843, smart phones/tablets 845, media players 847, and/or computers/computing devices 849.

The chaos generation module 401 of the present invention can be further incorporated into Internet of Thing (IoT) sensors 810 for various applications, such as home automation 821, automotive 823, user interface 825, lifestyle and/or entertainment 827, city and/or infrastructure 829, retail 811, tags and/or trackers 813, platform and components 815, toys 817, and/or healthcare 819. The IoT sensors 810 can communicate with the chaos generation module 401. Of course, one skilled in the art can contemplate incorporating such chaos generation module 401 formed therein into any type of electronic devices for any types of applications, not limited to the ones described herein.

Figure 6:
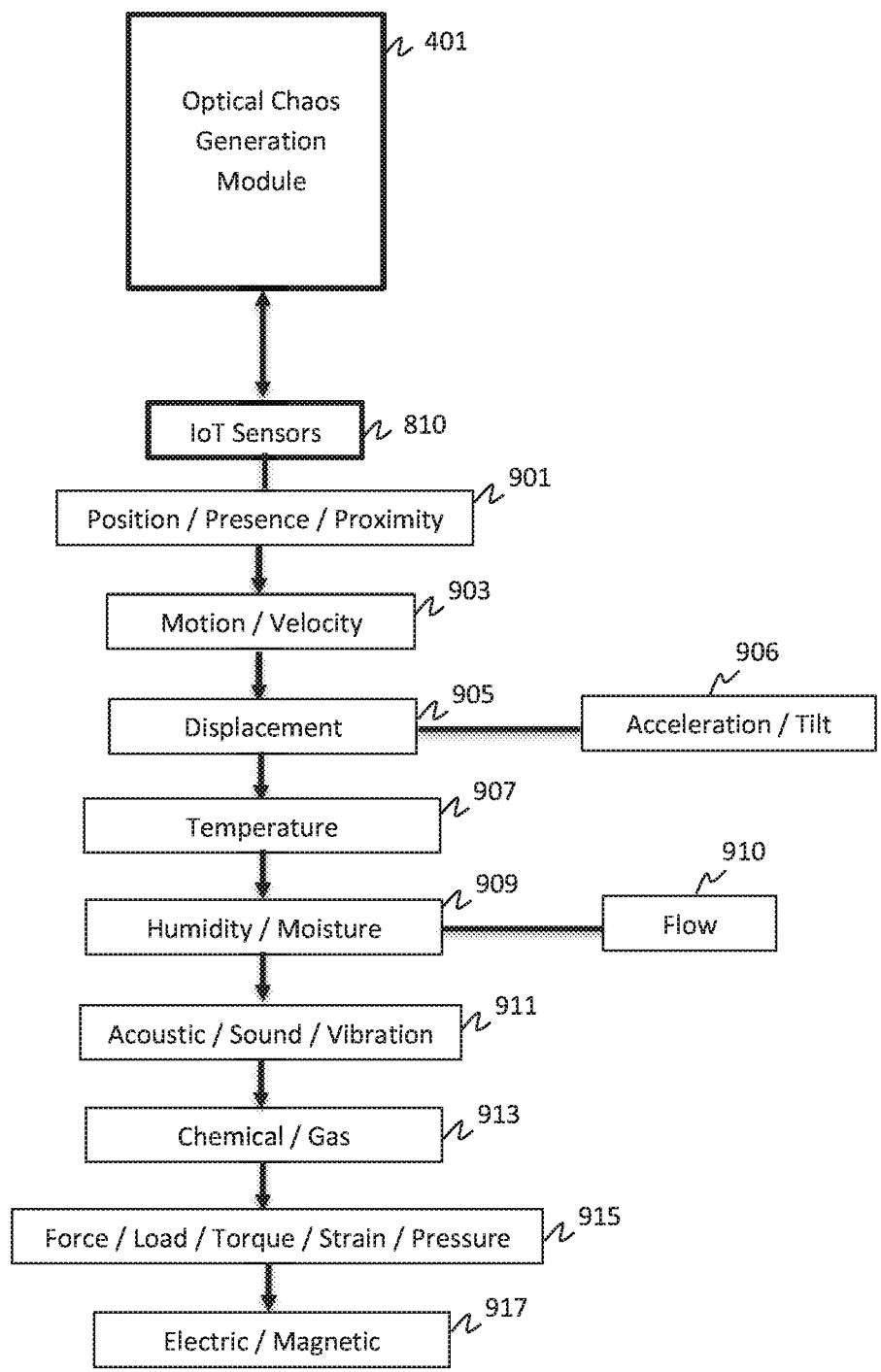
FIG. 6 is a block/flow diagram of exemplary IoT sensors used to collect data or information for authenticating access points via a chaos generation module within the IoT systems/devices/infrastructure, in accordance with embodiments of the present invention.

FIG. 6 is a block/flow diagram of exemplary IoT sensors used to collect data/information for authenticating access points via a chaos generation module within the IoT systems/devices/infrastructure, in accordance with embodiments of the present invention.

IoT loses its distinction without sensors. IoT sensors act as defining instruments which transform IoT from a standard passive network of devices into an active system capable of real-world integration.

The IoT sensors 810 can transmit information/data, continuously and in real-time, to the chaos generation module 401. Exemplary IoT sensors 810 can include, but are not limited to, position/presence/proximity sensors 901, motion/velocity sensors 903, displacement sensors 905, such as acceleration/tilt sensors 906, temperature sensors 907, humidity/moisture sensors 909, as well as flow sensors 910, acoustic/sound/vibration sensors 911, chemical/gas sensors 913, force/load/torque/strain/pressure sensors 915, and/or electric/magnetic sensors 917. One skilled in the art can contemplate using any combination of such sensors to collect data/information and input into the chaos generation module 401 for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover data collection software can be used to manage sensing, measurements, light data filtering, light data security, and aggregation of data. Data collection software uses certain protocols to aid IoT sensors in connecting with real-time, machine-to-machine networks (e.g., wireless networks that use chaos generation module 401). Then the data collection software collects data from multiple devices and distributes it in accordance with settings. Data collection software also works in reverse by distributing data over devices. The system can eventually transmit all collected data to, e.g., a central server.

Additionally, real-time analytics applications take data or input from various devices and convert it into viable actions or clear patterns for human analysis. They analyze information based on various settings and designs in order to perform automation-related tasks or provide the data required by industry. In the instant case, real-time analytics applications can aid the current system in sending signals, analyzing signals, and using chaos generation module 401 to detect node forgery.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules. The terms "block" and "module" can be interchangeable herein.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for authenticating, by an authentication mechanism, an access point attempting to access a wireless network, the method comprising:
   receiving an authentication challenge from the access point;
   analyzing the authentication challenge at a wireless node by using an optical chaos generation module having an optical section and a radio frequency (RF) section to facilitate reproducibility, unpredictability, and unclonability of challenge-response pairs, where each challenge-response pair is subjected to a two-phase authentication process including an enrollment phase and an authentication phase; and
   transmitting an optical chaos signal as an authentication response to the access point, the authentication response having a behavior that is reproducible for a legitimate node and having a behavior that is unpredictable for an unauthorized node,
   wherein, in the enrollment phase, the access point sends a plurality of authentication challenges to the wireless node and records all responses received therefrom, and wherein, in the authentication phase, the access point selects one challenge each time an authentication request is made,
   wherein the wireless node is an optical chaos device incorporating therein a receiving antenna and a transmitting antenna,
   wherein optical chaos generation and wireless communication are unified on a common platform to introduce interference strength into the optical chaos generation without a need for synchronization of the receiving antenna and the transmitting antenna, and
   wherein the optical chaos generation device processes the authentication response in binary digit form, a length of the authentication response being greater than a length of the authentication challenge to further facilitate the reproducibility, unpredictability and unclonability of challenge-response pairs, and overall security of the authentication mechanism, by requiring the unauthorized node to match both the authentication response and a corresponding digitization method adopted.

2. The method of claim 1, wherein introduction of the interference strength into the optical chaos generation further enhances the overall security of the authentication mechanism.

3. The method of claim 1, wherein the optical chaos generation module includes a semiconductor laser and a delayed opto-electronic feedback module.

4. The method of claim 1, wherein the optical section includes a laser diode that provides an optical output delayed in a time domain by a tunable delay line.

5. The method of claim 4, wherein the delayed optical output is received by a photodiode.

6. The method of claim 5, wherein the RF section includes an RF amplifier that amplifies an RF output of the photodiode.

7. The method of claim 1, wherein the challenge-response pair reproducibility ensures a same challenge results in a stable response.

8. The method of claim 1, wherein the challenge-response pair unpredictability ensures different challenge results in mutually different responses.

9. A system for authenticating, by an authentication mechanism, an access point attempting to access a wireless network, the system comprising:
a memory; and
a processor in communication with the memory, wherein the processor is configured to:
receive an authentication challenge from the access point;
analyze the authentication challenge at a wireless node by using an optical chaos generation module having an optical section and a radio frequency (RF) section to facilitate reproducibility, unpredictability, and unclonability of challenge-response pairs, where each challenge-response pair is subjected to a two-phase authentication process including an enrollment phase and an authentication phase; and
transmit an optical chaos signal as an authentication response to the access point, the authentication response having a behavior that is reproducible for a legitimate node and having a behavior that is unpredictable for an unauthorized node,
wherein, in the enrollment phase, the access point sends a plurality of authentication challenges to the wireless node and records all responses received therefrom, and wherein, in the authentication phase, the access point selects one challenge each time an authentication request is made,
wherein the wireless node is an optical chaos device incorporating therein a receiving antenna and a transmitting antenna,
wherein optical chaos generation and wireless communication are unified on a common platform to introduce interference strength into the optical chaos generation without a need for synchronization of the receiving antenna and the transmitting antenna, and
wherein the optical chaos generation device processes the authentication response in binary digit form, a length of the authentication response being greater than a length of the authentication challenge to further facilitate the reproducibility, unpredictability and unclonability of challenge-response pairs, and overall security of the authentication mechanism, by requiring the unauthorized node to match both the authentication response and a corresponding digitization method adopted.

10. The system of claim 9, wherein introduction of the interference strength into the optical chaos generation further enhances the overall security of the authentication mechanism.

11. The system of claim 9, wherein the optical chaos generation module includes a semiconductor laser and a delayed opto-electronic feedback module.

12. The system of claim 9, wherein the optical section includes a laser diode that provides an optical output delayed in a time domain by a tunable delay line.

13. The system of claim 12, wherein the delayed optical output is received by a photodiode.

14. The system of claim 13, wherein the RF section includes an RF amplifier that amplifies an RF output of the photodiode.

15. The system of claim 9, wherein the challenge-response pair reproducibility ensures a same challenge results in a stable response.

16. The system of claim 9, wherein the challenge-response pair unpredictability ensures different challenge results in mutually different responses.

17. A non-transitory computer-readable storage medium comprising a computer-readable program for authenticating, by an authentication mechanism, an access point attempting to access a wireless network, wherein the computer-readable program when executed on a computer causes the computer to perform the steps of:
receiving an authentication challenge from the access point;
analyzing the authentication challenge at a wireless node by using an optical chaos generation module having an optical section and a radio frequency (RF) section to facilitate reproducibility, unpredictability, and unclonability of challenge-response pairs, where each challenge-response pair is subjected to a two-phase authentication process including an enrollment phase and an authentication phase; and
transmitting an optical chaos signal as an authentication response to the access point, the authentication response having a behavior that is reproducible for a legitimate node and having a behavior that is unpredictable for an unauthorized node,
wherein, in the enrollment phase, the access point sends a plurality of authentication challenges to the wireless node and records all responses received therefrom, and wherein, in the authentication phase, the access point selects one challenge each time an authentication request is made,
wherein the wireless node is an optical chaos device incorporating therein a receiving antenna and a transmitting antenna,
wherein optical chaos generation and wireless communication are unified on a common platform to introduce interference strength into the optical chaos generation without a need for synchronization of the receiving antenna and the transmitting antenna, and
wherein the optical chaos generation device processes the authentication response in binary digit form, a length of the authentication response being greater than a length of the authentication challenge to further facilitate the reproducibility, unpredictability and unclonability of challenge-response pairs, and overall security of the authentication mechanism, by requiring the unauthorized node to match both the authentication response and a corresponding digitization method adopted.

18. The non-transitory computer-readable storage medium of claim 17, wherein introduction of the interference strength into the optical chaos generation further enhances the overall security of the authentication mechanism.

19. The non-transitory computer-readable storage medium of claim 18, wherein the optical chaos generation module includes a semiconductor laser and a delayed opto-electronic feedback module.

20. The non-transitory computer-readable storage medium of claim 19,
- wherein the optical section includes a laser diode that provides an optical output delayed in a time domain by a tunable delay line;
- wherein the delayed optical output is received by a photodiode; and
- wherein the RF section includes an RF amplifier that amplifies an RF output of the photodiode.

* * * * *